US 8,738,571 B1

(12) United States Patent
Abdulla

(10) Patent No.: US 8,738,571 B1
(45) Date of Patent: May 27, 2014

(54) EXTENDED RECYCLE BIN

(75) Inventor: Shameel Abdulla, Kerala (IN)

(73) Assignee: EMC Corporation, Hopkinton, MA (US)

(*) Notice: Subject to any disclaimer, the term of this patent is extended or adjusted under 35 U.S.C. 154(b) by 32 days.

(21) Appl. No.: 13/436,449

(22) Filed: Mar. 30, 2012

(51) Int. Cl.
*G06F 7/00* (2006.01)

(52) U.S. Cl.
USPC .................................................. 707/626

(58) Field of Classification Search
USPC ............................................. 707/662
See application file for complete search history.

(56) References Cited

U.S. PATENT DOCUMENTS

| | | | |
|---|---|---|---|
| 2007/0130232 A1* | 6/2007 | Therrien et al. | 707/204 |
| 2007/0143351 A1* | 6/2007 | Sawaya et al. | 707/200 |
| 2007/0208669 A1 | 9/2007 | Rivette et al. | |
| 2011/0040812 A1 | 2/2011 | Phillips | |
| 2011/0093471 A1 | 4/2011 | Brockway et al. | |
| 2011/0246429 A1 | 10/2011 | Prahlad et al. | |
| 2013/0067138 A1 | 3/2013 | Schuette et al. | |

* cited by examiner

*Primary Examiner* — Truong Vo
(74) *Attorney, Agent, or Firm* — Theodore A. Chen; Krishnedu Gupta; Ying Li

(57) ABSTRACT

This disclosure relates to a method, article of manufacture, and apparatus for removing a file from an extended recycle bin. In some embodiments, this includes receiving a deletion request of the file from the extended recycle bin, determining a prevent delete setting of the extended recycle bin, deleting the file from the extended recycle bin if the prevent delete setting is enabled, prevent deletion of a corresponding file from a secondary storage, deleting the file from the extended recycle bin if the prevent delete setting is not enabled, and deleting the corresponding file from the secondary storage.

11 Claims, 5 Drawing Sheets

EXTENDED RECYCLE BIN

CROSS-REFERENCE TO RELATED APPLICATIONS

This application is related to co-pending U.S. patent application Ser. No. 13/436,495 for EXTENDED RECYCLE BIN FOR VERSIONING and filed concurrently herewith, which is incorporated herein by reference for all purposes.

FIELD

This invention relates generally to computer systems, and more particularly to systems and methods of restoring files on computer systems.

BACKGROUND

Businesses often juggle the need of retaining data while keeping their computer systems efficient. Data must be kept for a period of time to comply with regulatory requirements. And as an optimal business practice, businesses need to retain backup data so that they are readily available for disaster recovery. However, keeping every bit of data is impractical and may clutter computer systems. Further, some data including backup data may be accessed very rarely. In extreme cases, the access rate may be once in a few years. Thus, businesses may desire to remove these rarely accessed files so that valuable storage space may be freed up to store more recent data and unnecessary clutter may be reduced.

Archiving is often used in conjunction with backup techniques to free up valuable storage space while maintaining valuable data for regulatory compliance and/or disaster recovery. During archiving, files may be migrated from a primary storage to a secondary storage and replaced with stubs containing file attributes. The stubs are relatively small in size and may be used to redirect an access request to a new file location in the secondary storage. When a user needs to access the files at a later time, applications may seamlessly recall the files from the secondary storage. Thus, in view of the user, the files still appear to reside on the primary storage, even though stubs may have taken place of the actual files. By storing smaller sized stubs on high cost storage during archiving, and backing up stubs generated during archiving, businesses may realize cost saving and improve the efficiency of computer systems.

Even though archiving frees up valuable storage space, a large number of stubs corresponding to a large number of rarely accessed files may present the same clutter to businesses. Thus, users may want to clean up these rarely accessed stubs, but be able to access them when needed, such as when complying with regulatory requirements and/or in case of disaster recovery.

There is a need, therefore, for an improved method or system that leverages on backup and archiving techniques to provide extended deletion and restoration function.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
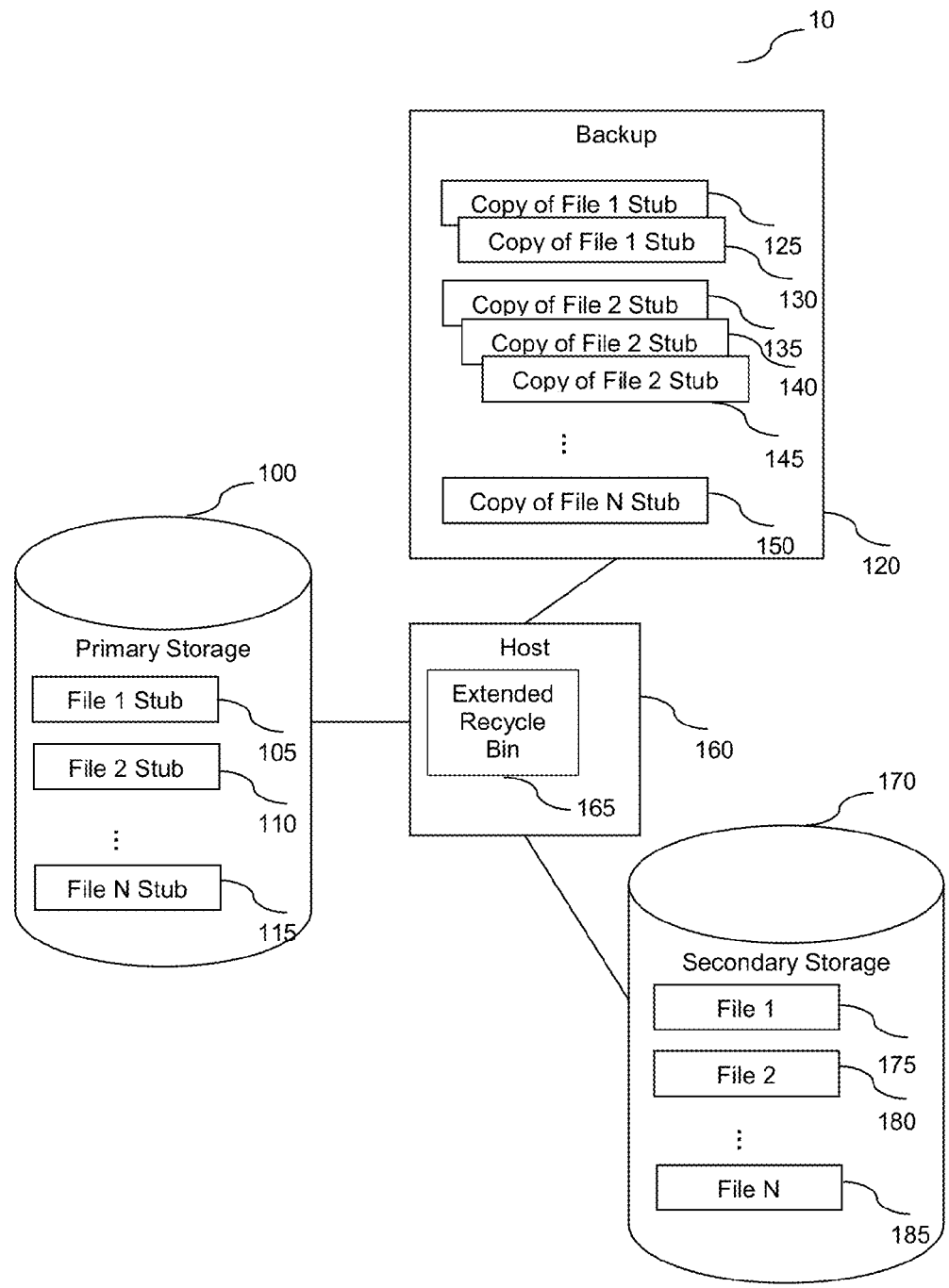
FIG. 1 is a diagram of a data storage system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

Some contemporary operating systems offer recycle bin functionality that allows data to be deleted and possibly to be recovered later. A recycle bin serves as a means of temporarily storing and protecting data that has been marked for deletion, but has not yet been removed from the computer system. Under this conventional approach, when the user puts an object such as a file and/or directory to the recycle bin, or deletes an object, the object has not yet been deleted. The user has the ability to restore the object in the recycle bin, thus return the deleted file and/or directory to its former location.

Subsequent to placing an object in a recycle bin, delete functionality in contemporary operating systems also allows for the object to be permanently deleted, e.g., by using Shift-Delete in the Windows® operating system, or when the user decides to empty the recycle bin. Once a user permanently deletes these files and/or directories, the space in the computer system may be freed, and the clutter on the computer system may be reduced. However, once the object is permanently deleted, it is often difficult to recover the information through a conventional recycle bin.

Another common way that users may wish to clean the computer system is by keeping only the latest version of a file. For example, users often create a new file by opening an existing file, making changes to it, and then saving the file. As can be readily appreciated, the presence of a conventional recycle bin does nothing to protect against the loss of a different file version. As a result, a conventional recycle bin is not capable of restoring multiple versions of a deleted file.

FIG. 1 is a system architecture illustrating one embodiment of a data storage system that leverages backups and archives to extend the functionality of a recycle bin. The extended recycle bin allows not only restoring deleted filed, but also restoring multiple versions of a previously deleted or replaced file. Data Storage System 10 includes Host 160, Primary Storage 100, Secondary Storage 170, and Backup 120 interconnected by one or more communication connections.

Host 160 may contain tools and/or logics to perform a variety of data processing tasks and operations such as backing up data, storing and retrieving data using storage devices including Primary Storage 100 and/or Secondary Storage 170. These storage devices may be internal or external to Data Storage System 10. In some embodiments, an internal storage device may include one storage device or a plurality of storage devices. Similarly, in some embodiments, an external storage device may include one storage device or a plurality of storage devices. Further, these storage devices need not be physical. These storage devices may be virtual devices residing in a physical computer system, or may be a single virtual device residing across multiple physical computer systems.

Primary Storage 100 may store data generated by Host 160 and provide data when requested by Host 160. Files are also often moved between different storage devices in order to relocate infrequently accessed files from expensive and high speed Primary Storage 100 to more economical and possibly slower Secondary Storage 170. In a preferred embodiment, Secondary Storage 170 may be a Centera from EMC Corporation of Hopkinton, Mass.

When a file is moved from Primary Storage 100 to Secondary Storage 170, the file in Primary Storage 100 may be replaced with a stub that contains attributes of the file and a pointer to the new file location in Secondary Storage 170. The stub may be used to redirect an access request from a client to the new file location in Secondary storage 170, or to migrate data from the present file location back to Primary Storage 100. For example, as shown in the exemplary Data Storage System 10, after File 1 175, File 2 180 . . . File N 185 are migrated to Secondary Storage 170, these files may be replaced with stubs File 1 Stub 105, File 2 Stub 110 . . . File N Stub 115 on Primary Storage 100.

Still referring to FIG. 1, Backup 120 may include copies of stubs. The copies may represent multiple versions of the stubs. Each version may be a snapshot copy of a consistent state of a stub as it existed at a particular point in time. Various schemes may be used to generate snapshots or copies of the stub. The choice of a copy generating scheme may not be important for the purpose of the methods and systems described here. Though FIG. 1 shows Backup 120 to be separate from Host 160, Primary Storage 100, and Secondary Storage 170, in some embodiments Backup may reside inside Host 160, Primary Storage 100, and/or Secondary Storage 170.

Further as shown in FIG. 1, depending on the configurations of a particular backup method, there may be multiple copies for each stub. For example, File N Stub 115 may have one backup copy, Copy of File N Stub 150 stored in Backup 120. File 1 Stub 105 may have two backup copies, Copy of File 1 Stub 125 and Copy of File 1 Stub 130, with each copy representing a consistent state of File 1 Stub 105 as it existed at a particular point in time. Similarly, File 2 Stub 110 may have three backup copies, Copy of File 2 Stub 135, Copy of File 2 Stub 140, and Copy of File 2 Stub 145.

As shown in FIG. 1, Host 160 may include logics to execute the function of an Extended Recycle Bin 165. Though FIG. 1 depicts only one Extended Recycle Bin 165, in accordance with some embodiments, Data Storage System 10 may include multiple Extended Recycle Bins 165, with each Extended Recycle Bin 165 corresponding to one Primary Storage 100. Each Extended Recycle Bin 165 may use disk space on Primary Storage 100. Through the execution of tools and/or logics on Host 160, stubs may be deleted and placed in Extended Recycle Bin 165. The objects placed in Extended Recycle Bin 165 continue to factor into the total space available for Primary Storage 100 until Extended Recycle Bin 165 is emptied.

Similarly to a conventional recycle bin, Extended Recycle Bin 165 may temporarily store stubs that have been marked for deletion, but have not yet been removed from Data Storage System 10. Different from a conventional recycle bin, Extended Recycle Bin 165 has the additional functionality of preventing deletion of files from Secondary Storage 170. By enabling prevent delete option as shown in a user screen representation in FIG. 2, removal of stub from Primary Storage 100 does not trigger removal of the corresponding files from Secondary Storage 170. Thus, relative to a conventional recycle bin, Extended Recycle Bin 165 may preserve the file in Data Storage System 10 after removal of a stub and enable restoring a file and/or multiple versions of the file.

Figure 2:
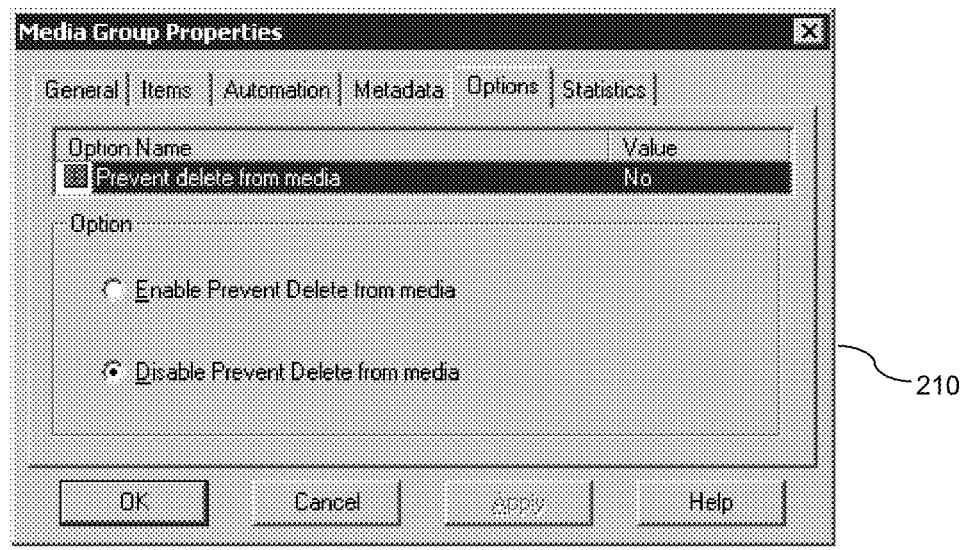
FIG. 2 is an exemplary representation of a user screen for enabling the use of the tool of FIG. 1 in accordance with some embodiments.
Figure 3:
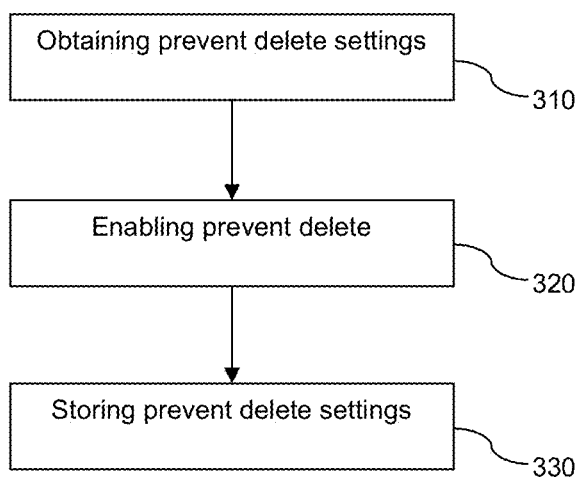
FIG. 3 is a flow chart of a method to enable extended recycle bin prevent delete option in accordance with some embodiments.

Referring to FIG. 2, the screen shot gives an exemplary view of a user screen for enabling prevent deletion option of an extended recycle bin. Screen 210 may include a list of current options for one or more storage devices. As shown in FIG. 2, a user has the option of either disable or enable prevent deletion from media, e.g. Secondary Storage 170. A current option value of "No" corresponds to the selection of Disable Prevent Delete from media option. Once Enable Prevent Delete from media option is chosen, the user may click OK button to save the selection and enable the functionality of preventing deletion from propagating to Secondary Storage 170. The logical interaction behind FIG. 2 screenshot is shown in FIG. 3.

In some embodiments, current prevent delete settings may be obtained in step 310. For example, referring back to FIG. 2, the option value illustrated in the screen shot is No, which corresponds to prevent delete settings disabled. Once Enable Prevent Delete from media option is chosen and saved, in step 320, prevent delete may be enabled. Subsequently, the new settings may be stored in step 330. With prevent delete option enabled, when a user empties Extended Recycle Bin to remove a stub from Data Storage System 10, the corresponding file as well as multiple versions of the file may remain in Data Storage System 10. The processes and steps following a request of emptying an extended recycle bin are shown in FIG. 4.

Figure 4:
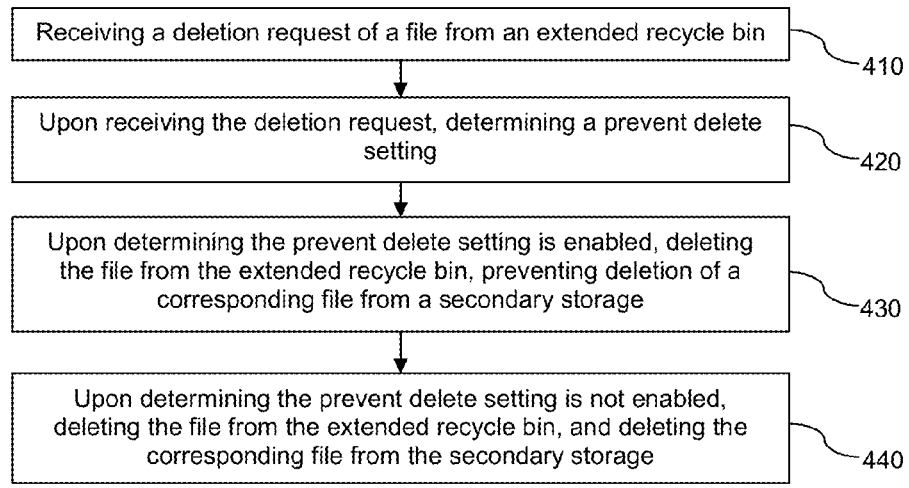
FIG. 4 is a flow chart of a method to empty extended recycle bin in accordance with some embodiments.

In step 410 of FIG. 4, in accordance with some embodiments, a deletion request of a file from an extended recycle bin may be received. The request may come from the action of emptying the extended recycle bin, manually or programmatically removing the file from the extended recycle bin. In some embodiments, the file placed in the extended recycle bin may be a stub corresponding to a file stored on Secondary Storage 170. Upon receiving the deletion request, prevent delete setting is analyzed in step 420. If the prevent delete setting is enabled, in step 430, the stub in the extended recycle bin may be deleted, while the file associated with the stub remains on Secondary Storage 170. On the other hand, if the prevent delete setting is not enabled, in step 440, both the stub and the file associated with the stub may be removed from Data Storage System 10.

Figure 5:
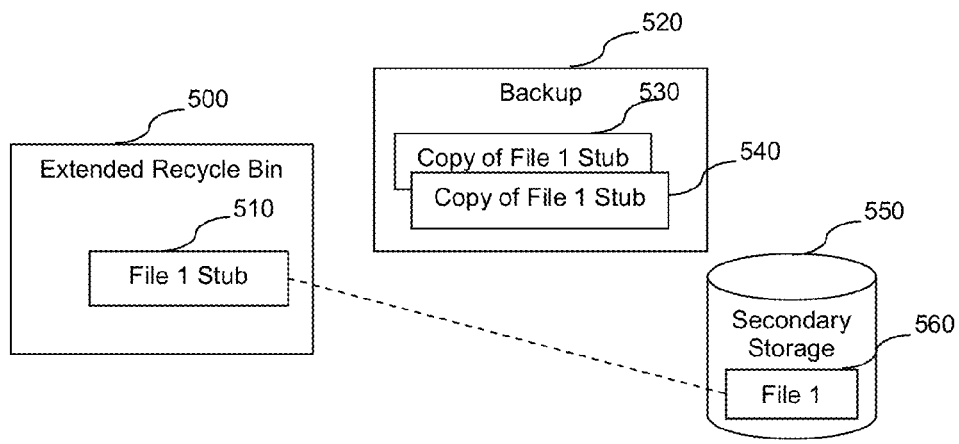
FIG. 5 is a diagram of utilizing extended recycle bin to restore a file in accordance with some embodiments.
Figure 6:
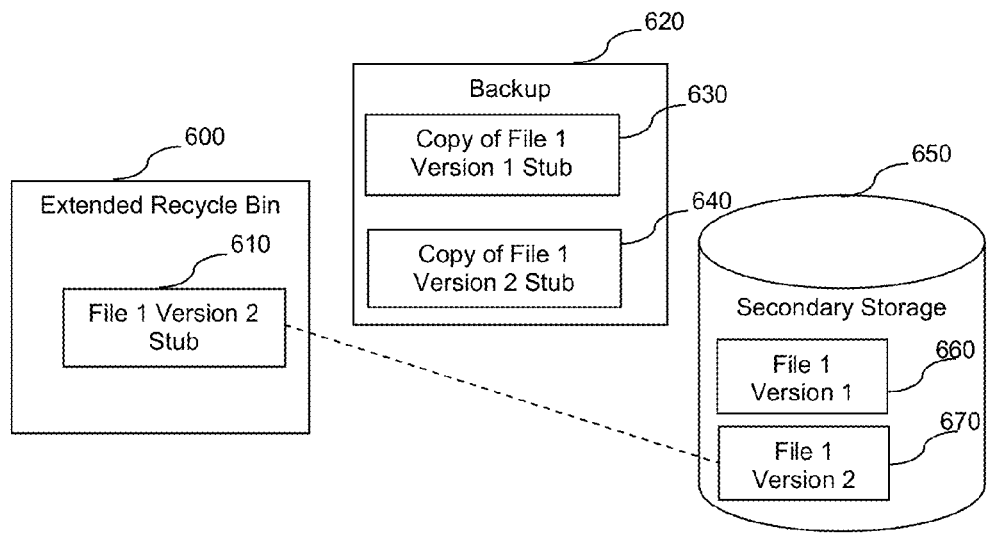
FIG. 6 is a diagram of utilizing extended recycle bin to restore multiple versions of a file in accordance with some embodiments.
Figure 7:
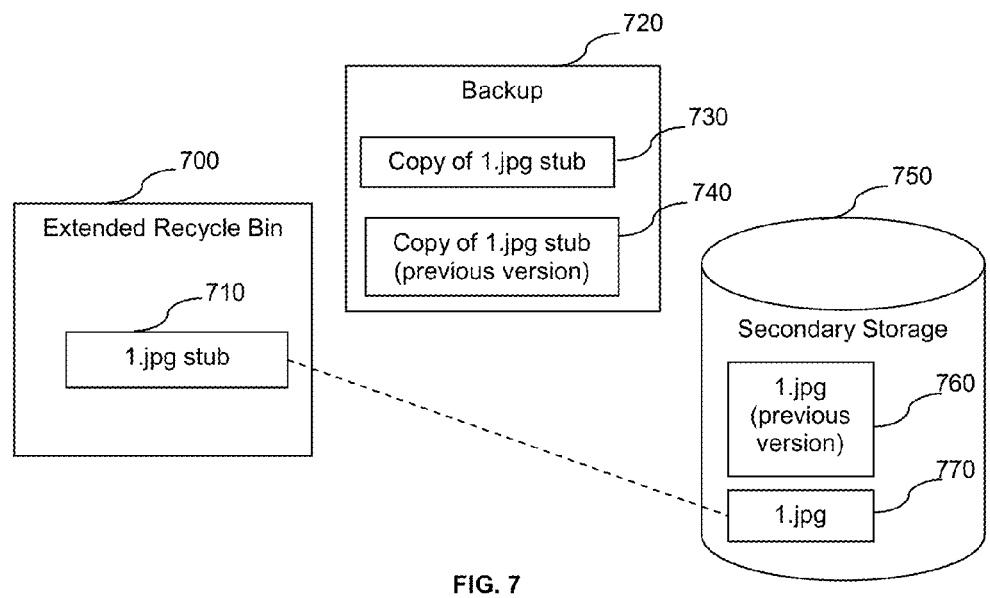
FIG. 7 is a diagram of utilizing extended recycle bin to restore multiple versions of a replaced file in accordance with some embodiments.

Relative to a conventional recycle bin, an extended recycle bin with prevent delete setting enabled allows restoration of files even after emptying the extended recycle bin. Further, through prevent delete enabled extended recycle bin, multiple versions of a file may be restored. FIGS. 5-7 illustrate exemplary scenarios of replaced files after being deleted through a prevent delete enabled extended recycle bin.

In an exemplary scenario, as show in FIG. 5, a user may wish to clean up some infrequently accessed files by placing them in Extended Recycle Bin 500. Due to the age of File 1 560, it may well have been archived to Secondary Storage 550. During the archival migration process, File 1 560 may be replaced by File 1 Stub 510. The migration process is transparent to the user. Thus, the user may continue to access the file through the stub as if the file is still on a local storage. Subsequently, when a user needs to clean up infrequently accessed files, the user may place File 1 Stub 510 in Extended Recycle Bin 500. To restore the access to File 1 560, the user may move File 1 Stub 510 out of Extended Recycle Bin 500 and restore to its former location. Since File 1 Stub 510 maintains the property of pointing to the actual location of File 1 560 stored on Secondary Storage 550, through restored File 1 Stub 510, a user may resume the access to File 1.

When File 1 Stub 510 is placed in Extended Recycle Bin 500, File 1 Stub 510 may still claim space on Data Storage System 10. In another exemplary scenario, the user may wish to remove infrequently accessed File 1 Stub 510 from Extended Recycle Bin 500 to free up valuable space for more active data. File 1 Stub 510 may be removed from Data Storage 10 by emptying Extended Recycle Bin 500, by manually or programmatically deleting from Extended Recycle Bin 500. With prevent delete option enabled, File 1 560 may remain on Secondary Storage 550 even though File 1 Stub 510 is deleted from Extended Recycle Bin 500. Stated differently, when prevent delete option is chosen for Extended Recycle Bin 500, the deletion of File 1 Stub 510 from Extended Recycle Bin 500 does not propagate to Secondary Storage 550. By retaining File 1 on Secondary Storage, the user may restore Copies of File 1 Stub 530 and/or 540 from Backup to Primary Storage and access File 1 560 through the stubs.

An additional benefit of having an extended recycle bin with prevent delete option enabled may be that multiple versions of a file may be restored. In accordance with some embodiments, FIG. 6 illustrates an exemplary scenario of retrieving multiple versions of a deleted file. For example, assuming File 1 Version 2 670 is a newer version of File 1 Version 1 670. Similar to the scenario illustrated in FIG. 5, a user may wish to clean up infrequently accessed file such as File 1 Version 2 670 and free up the space for more active data by first placing File 1 Version 2 Stub 610 in Extended Recycle Bin 600, then emptying Extended Recycle Bin 600. And similar to the exemplary scenario described above, with prevent delete option enabled, the deletion of File 1 Version 2 Stub 610 does not propagate to Secondary Storage 650. Later on, the user may restore and move File 1 Version 2 Stub 610 out of Extended Recycle Bin 610. Through the restored File 1 Version 2 Stub 610, File 1 Version 2 670 may be retrieved from Secondary Storage 650. Alternatively, the user may locate Copy of File 1 Version 2 Stub 640 from Backup 620, restore File 1 Version 2 Stub 610, then locate and restore File 1 Version 2 670 through File 1 Version 2 Stub 610 pointer.

Furthermore, as shown in FIG. 6, prior to placing File 1 Version 2 Stub 610 in Extended Recycle Bin 600, the user may have already cleaned up and deleted even less frequently accessed stub corresponding to File 1 Version 1 660. Even though the stub is no longer present in Data Storage System 10, with prevent delete option enabled, emptying Extended Recycle Bin 600 does not remove File 1 Version 1 660 from Secondary Storage 660. As shown in FIG. 6, File 1 Version 1 660 remains on Secondary Storage 650 even though the corresponding stub is not present. The existence of File 1 Version 1 660 may enable the user to restore File 1 Version 1 660. The steps of restoring File 1 Version 1 660 may include first locating and restoring Copy of File 1 Version 1 Stub 630, then following the pointer of Copy of File 1 Version 1 Stub 630 to access File 1 Version 1 660. Thus, having Extended Recycle Bin 600 with prevent delete option enabled may allow a user to restore not only one version of a file after emptying Extended Recycle Bin 600, but also multiple versions of the file.

The exemplary scenario depicted in FIG. 6 assumes File 1 Version 1 and File 1 Version have different names, e.g. Report for 2011.doc as a previous version of Report for 2012.doc. In some embodiments, as illustrated in FIG. 7, recovering multiple versions of a file may be possible even if multiple versions of the file share the same name. The recovery of multiple versions of a file sharing the same name addresses the need of restoring a replaced prior version.

For example, as illustrated in FIG. 7, a user may wish to unclutter the system by using only a file name 1.jpg. The user may create a new version of file by first restoring the previous version similar to the scenario illustrated in FIG. 5, opening the previous version 1.jpg, making changes, then saving the file. Later on, when 1.jpg is rarely accessed, the user may clean up the system and free up valuable space by first placing 1.jpg stub 710 in Extended Recycle Bin 700, then emptying Extended Recycle Bin 700. In some embodiments, using Content Addressable Storage (CAS) as Secondary Storage 750 may enable restoration of multiple versions of a file after the file appears to be replaced.

Different from traditional location addressed storage, the file access method for CAS is content based addressing. When information is stored into a CAS system, the system may record a content based address, which is an identifier uniquely and permanently linked to the information content itself. For example, a CAS system may calculate a hash value using the content, and use the calculated hash value as a content identifier. A request to retrieve information from a CAS system may provide the content identifier, e.g., the hash value, from which the system can determine the physical location of the data and retrieve it. Because the identifiers are based on content, any changes to a data element will necessarily change its content address.

Using CAS as Secondary Storage 750 has the advantage of maintaining different versions of a file even if different versions share the same name. Since the content identifier may be a hash value calculated using the content of the file, once the content changes, the content identifier may be different even if the file names are the same. As a result, two files with the same name may be stored separately with two different content addresses on Secondary Storage 750. Thus, using CAS as storage, a new version of a file may not replace a previous version even if two versions have the same name.

Referring back to FIG. 7, for example, using CAS as Secondary Storage, even though both 1.jpg 760 and 1.jpg 770 may have the same file name, two files are stored separately on Secondary Storage 750. This is because after any modification to 1.jpg, the content identifier may change due to the hash value change. Similar to the exemplary scenario illustrated in FIG. 6, the user may restore the current version of 1.jpg 770 either by recovering 1.jpg stub 710 from Extended Recycle Bin 700 or by first locating and restoring Copy of 1.jpg stub 730, then following the pointer of the stub to restore 1.jpg 770. Also similar to the exemplary scenario illustrated in FIG. 6, the user may restore the previous version of 1.jpg 760 by first locating and restoring the previous version Copy of 1.jpg stub 740, then following the pointer of the stub to restore the previous version of 1.jpg 760. Thus, having Extended Recycle Bin 700 with prevent delete option enabled may allow a user to restore not only one version of 1.jpg after emptying Extended Recycle Bin 700, but also multiple versions of 1.jpg.

In a preferred embodiment, Secondary Storage 750 may be a CAS such as Centera from EMC Corporation of Hopkinton, Mass. Alternative candidates may include so-called WORM devices, which provide write-once, read-many functionality. For example, in some embodiments, Secondary Storage 750 may be tape devices. In other embodiments, Secondary Storage 750 may be virtual tapes constituted by one or more tape devices. Secondary Storage 750 may also be a cloud storage using file object identifiers for archiving and file retrieval.

Figure 8:
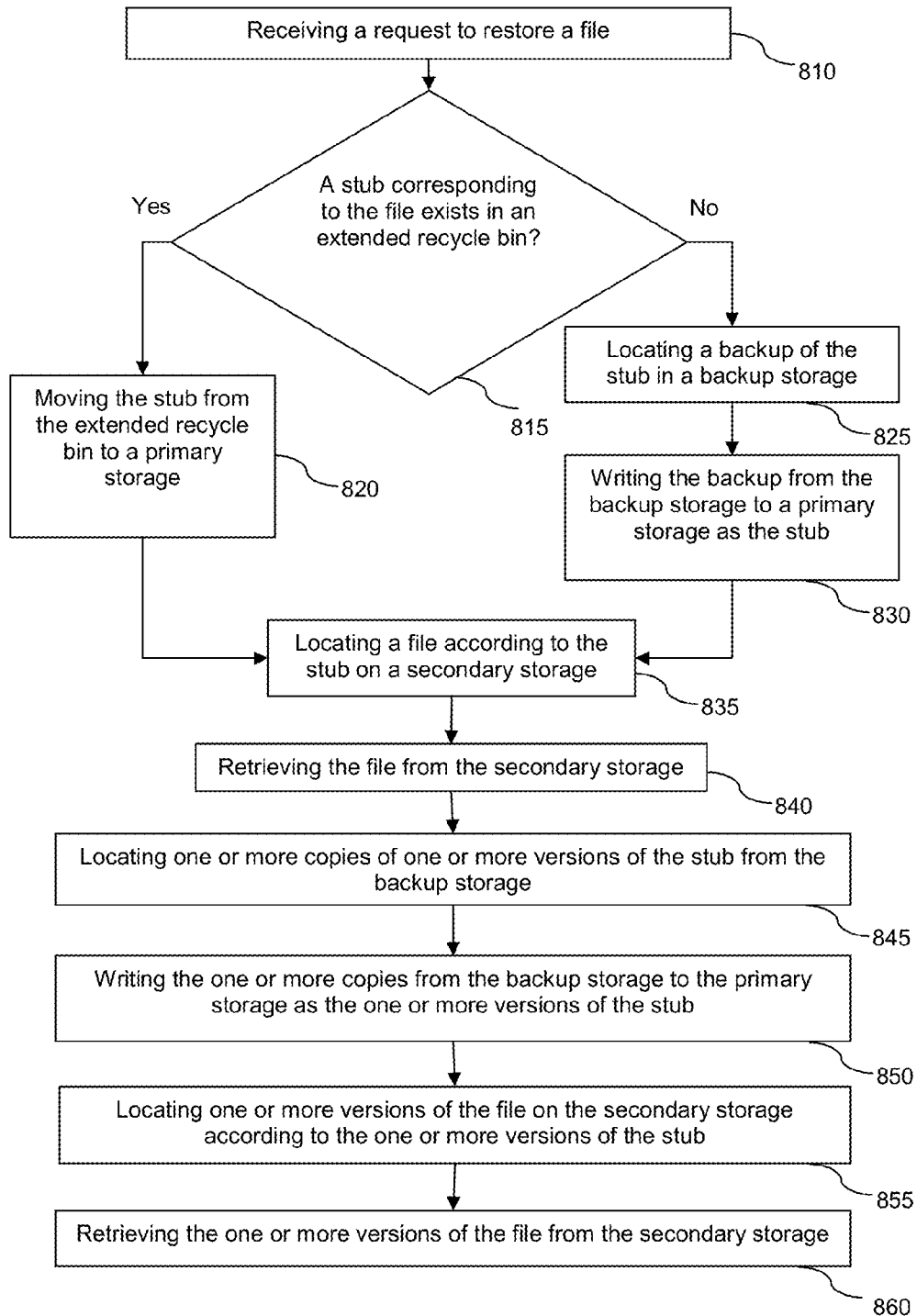
FIG. 8 is a flow chart of a method to carry out the restoring function after a file is deleted through a prevent delete enabled extended recycle bin in accordance with some embodiments.

The method to perform the operations depicted in FIGS. 5-7 is shown in FIG. 8. In step 810, a request to restore a file may be received. Upon receiving the request, in step 815, an extended recycle bin may be analyzed to determine if a stub corresponding to the file requested is present in the extended recycle bin. If the stub is in the extended recycle bin, in step 820, a user may initiate a restore of the stub by moving the stub out of the extended recycle bin and moving to a former location on a primary storage. The user may then follow restored stub pointer to locate a file stored on a secondary storage in step 835 and retrieve the file in step 840. Alternatively, the extended recycle bin may not contain a stub corresponding to the file requested due to permanent removal of the stub from the extended recycle bin. When the stub cannot be located from the extended recycle bin, a copy of the stub may be located from a backup storage in step 825. Subsequently, the copy may be restored from the backup storage to a former location of the stub on a primary storage in step 830. Again, the user may then follow restored stub pointer to locate the file stored on a secondary storage in step 835 and retrieve the file in step 840.

Having located and restored the file, in step 845, one or more versions of the stub saved as copies of the stub may be located from the backup storage, with each copy representing a former consistent state of the stub. The one or more versions of the stub may be restored by copying the one or more versions of the stub from the backup storage to the primary storage in step 850. Following the pointers of the one or more versions of the stub, one or more versions of the file may be located on the secondary storage in step 855 and retrieved in step 860.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for removing a file from an extended recycle bin, comprising:

receiving a request to delete the file from the extended recycle bin, wherein the file has been migrated from a primary storage to a secondary storage and replaced with a stub on the primary storage, the stub is associated with at least one version of the file stored on the secondary storage;

upon receiving the request, determining a prevent delete setting of the extended recycle bin;

upon the determination that the prevent delete setting is enabled, deleting the stub from the extended recycle bin, and preventing deletion of the at least one version of the file from the secondary storage, wherein the at least one version of the file is stored on the secondary storage based on the content of the at least one version of the file;
upon the determination that the prevent delete setting is not enabled, deleting the stub from the extended recycle bin; and deleting the at least one version of the file from the secondary storage.

2. The method as recited in claim 1, wherein the primary storage includes a group of primary storages.

3. The method as recited in claim 2, wherein the extended recycle bin includes a group of extended recycle bins, wherein each extended recycle bin in the group is associated with a primary storage in the group of primary storages.

4. The method as recited in claim 1, wherein the secondary storage includes a group of secondary storages.

5. The method as recited in claim 1, wherein the secondary storage is one or more content addressable storages.

6. The method as recited in claim 1, wherein the secondary storage is one or more tape storage.

7. The method as recited in claim 1, wherein the secondary storage is one or more virtual tape storage.

8. The method as recited in claim 1, wherein the secondary storage is one or more cloud storage using object identifiers.

9. The method as recited in claim 1, wherein versions of the at last one version of the file have the same name.

10. A system for removing a file from an extended recycle bin, comprising: a processor configured to
receive a request to delete the file from the extended recycle bin, wherein the file has been migrated from a primary storage to a secondary storage and replaced with a stub on the primary storage, the stub is associated with at least one version of the file stored on the secondary storage,
upon receiving the request, determine a prevent delete setting of the extended recycle bin,
upon the determination that the prevent delete setting is enabled, delete the stub from the extended recycle bin and prevent deletion of the at least one version of the file from the secondary storage, wherein the at least one version of the file is stored on the secondary storage based on the content of the at least one version of the file,
upon the determination that the prevent delete setting is not enabled, delete the stub from the extended recycle and delete the at least one version of the file from the secondary storage.

11. A computer program product for removing a file from an extended recycle bin, comprising a non-transitory computer readable storage medium having machine readable code embodied therein for:
receiving a request to delete the file from the extended recycle bin, wherein the file has been migrated from a primary storage to a secondary storage and replaced with a stub on the primary storage, the stub is associated with at least one version of the file stored on the secondary storage;
upon receiving the request, determining a prevent delete setting of the extended recycle bin;
upon the determination that the prevent delete setting is enabled, deleting the stub from the extended recycle bin and preventing deletion of the at least one version of the file from the secondary storage, wherein the at least one version of the file is stored on the secondary storage based on the content of the at least one version of the file;
upon the determination that the prevent delete setting is not enabled, deleting the stub from the extended recycle bin; and deleting the at least one version of the file from the secondary storage.

* * * * *